United States Patent [19]

Gee

[11] Patent Number: 4,822,388

[45] Date of Patent: Apr. 18, 1989

[54] METHOD OF OPERATING MINERAL WOOL CUPOLAS AND USING SPENT ELECTROLYTIC ALUMINUM POT LINING

[76] Inventor: Kenneth H. Gee, R.D. #7, Black River Rd., Bethlehem, Pa. 18015

[21] Appl. No.: 159,789

[22] Filed: Feb. 24, 1988

Related U.S. Application Data

[63] Continuation-in-part of Ser. No. 19,639, Feb. 27, 1987, abandoned.

[51] Int. Cl.⁴ .................. C03B 40/00; C03B 37/00; C03B 5/04; C10L 5/40
[52] U.S. Cl. ............................. 65/2; 65/19; 65/134; 65/27; 44/15 R; 44/16 A; 44/591; 75/24; 75/41; 75/42; 501/36; 501/44
[58] Field of Search ............... 65/2, 19, 134, 27; 75/24, 41, 42; 501/36, 44; 204/243 R, 67, 294; 44/591, 15 R, 16 A

[56] References Cited

U.S. PATENT DOCUMENTS

| | | | |
|---|---|---|---|
| 533,771 | 2/1895 | Wood | 501/36 |
| 1,939,329 | 12/1933 | White | 106/36.3 |
| 2,020,403 | 11/1935 | Engle | 501/36 X |
| 2,193,982 | 3/1940 | Ramseyer | 106/36.3 |
| 2,300,930 | 11/1942 | Johnson | 106/50 |
| 2,414,068 | 1/1947 | Smith | 106/50 |
| 2,467,889 | 4/1949 | Harter et al. | 501/36 |
| 2,468,654 | 4/1949 | Brundell et al. | 75/30 |
| 2,576,312 | 11/1951 | Minnick | 501/36 |
| 3,666,653 | 5/1972 | De Varda | 204/243 R |
| 3,926,576 | 12/1975 | Schmalfeld et al. | 44/591 X |
| 4,039,451 | 6/1978 | Cass et al. | 44/16 A X |
| 4,099,949 | 5/1978 | Olds | 65/17 |
| 4,365,984 | 12/1982 | Gee | 65/2 |
| 4,405,723 | 9/1983 | Kainzner et al. | 501/36 |
| 4,430,187 | 2/1984 | Snaeland et al. | 204/243 R |

Primary Examiner—Robert L. Lindsay
Attorney, Agent, or Firm—O'Keefe & Wilkinson

[57] ABSTRACT

The operation of mineral wool cupolas is improved in several respects and a waste material is efficiently disposed of by using spent pot lining from electrolytic aluminum reduction vessels in the mineral wool cupolas as a partial or complete replacement for coke. The spent pot lining is impregnated with a cryolytic type slag material which aids in both reducing the reactivity of an already unreactive graphitic material such that it burns low in the cupola with desirable thermal results and also prevents the formation of siliceous build-up in the cupola hearth areas. Several variations of cryolytic impregnated carbonaceous materials having the desirable effect of the invention are possible and described.

28 Claims, 1 Drawing Sheet

METHOD OF OPERATING MINERAL WOOL CUPOLAS AND USING SPENT ELECTROLYTIC ALUMINUM POT LINING

CROSS REFERENCES TO RELATED APPLICATIONS

This application is a continuation-in-part of U.S. application Serial No. 019,639 filed Feb. 27, 1987 now abandoned.

BACKGROUND OF THE INVENTION

1. Field of the Invention

This invention relates generally to methods of operating mineral wool cupolas, fuel stock for mineral wool cupolas and using expended pot lining removed from electrolytic reduction vessels in the aluminum industry. More particularly, the invention relates to the provision of a particularly advantageous charge for mineral wool cupolas which provides an improved thermal balance and/or prevents siliceous build-up in the cupola, virtually eliminating shutdowns of the cupola, for removal of such build-up. Use of the charge also increases the smoothness of operation and the quality of the product as well as the yield. More particularly still, the invention relates to the use in the charge made to a mineral wool cupola of an effective amount of a fluorine containing carbon fuel charge which may comprise a sized charge of expended lining from electrolytic reduction vessels in the aluminum industry.

2. Description of the Prior Art

Mineral wool cupolas for the melting of silica containing slag and rock material and other siliceous materials to form a melt which can then be formed into elongated fibers useful for insulation and the like usually take the form of unlined, or so-called self lining, steel cupolas which receive a charge at the top and from which molten siliceous material is tapped from the bottom. After tapping, the molten siliceous product is commonly either centrifugally or pneumatically attenuated into long fibers, while the siliceous material is still molten. The resulting fibers are useful for insulation and the like.

Mineral wool cupolas are customarily charged with alternating layers of siliceous materials and coke. The siliceous materials may comprise various metallurgical furnace slags plus siliceous or silica containing rock such as trap rock. The coke is ignited in the lower portion of the cupola and is burned by air and/or oxygen admitted through tuyeres in the walls near the bottom of the cupola. The heat melts the siliceous materials into a homogenous composition that can be formed into fibers. Since the siliceous material is not corrosive to the walls of the cupola, the walls are customarily not lined, but are self lined by a thin layer of the chilled melt particularly against the water cooled walls of the hearth area. The bottom, or hearth, of the cupola usually has a layer of loam or clay material applied to it to protect the hearth from the molten charge and particularly from attack by residual molten metals which collect in the center of the hearth and are periodically tapped from the bottom of the furnace.

A fairly typical mineral wool cupola or shaft furnace is shown in U.S. Pat. No. 2,467,889 to I. Harter et al. which, however, shows the entire shaft wall enclosed in a water cooling jacket. Details of operation are also described by Harter. A wide ranging discussion of the operation of mineral wool production processes including various charge materials or raw materials may also be found in U.S. Pat. No. 2,576,312 to L.J. Minnick.

One serious difficulty encountered in mineral wool cupolas is so-called "siliceous build-up" in the hearth area of the cupola and particularly upon the surface of the hearth itself. Such build-up can seriously interfere with the capacity and operation of the cupola. The usual method of combating siliceous build-up is to take the cupola out of operation periodically, often as frequently as every week, and mechanically remove the siliceous build-up. Other potential solutions also have been tried. For example, cupolas have been designed in which the hearth bottom is vertically movable with respect to the remainder of the cupola so that as siliceous build-up occurs upon the hearth, the hearth is periodically lowered, usually by a screw arrangement, so the essential capacity of the hearth area remains at all times the same. Operators of conventional cupolas eventually have to "drop the bottom" or remove the hearth, usually by opening a door-like arrangement at the bottom to remove the entire hearth contents, in order to eliminate the siliceous build-up. It is, of course, particularly important that the effective height of the tuyeres from the hearth not be drastically altered so that ignition and burning of the coke in the charge remain at an optimum height above the hearth. However, it will be evident that the lowering of the hearth bottom is inherently limited and after such limits are reached the cupola must be taken out of operation and the bottom doors dropped to dump the excess build-up of deposits of siliceous material on the hearth. In some cupolas, furthermore, particularly where the side walls above the tuyeres are not vertical, but slant outwardly, such as in bosh type cupolas, siliceous build-up may occur on the side walls as well as in the hearth, seriously interfering with the operation of the cupola and even with dumping the siliceous build-up from the hearth.

Due to the detrimental build-up of highly siliceous fractions on the cupola hearth and occasionally on the side walls it has in the past been frequently necessary to limit the percentage of siliceous material in the cupola so that longer operating times can be obtained. However, the limitation on the content of siliceous material in the charge may not allow the production of the high silica fibers which may be desired.

A further attempt to limit siliceous build-up upon the hearth and side walls has involved the charging of chemical agents such as fluorides and the like to the cupola to cut, or decrease, the viscosity of the siliceous material in an attempt to prevent sticking and build-up on the walls and bottom of the cupola. Such efforts have not been successful in complete elimination of siliceous build-ups.

In addition to the above, since mineral wool is both a very desirable and a relatively inexpensive product due to the nature of the charge materials and its end use, price competition is severe and it is very important in order to be competitive to conduct an efficient, economical operation. It is important, therefore, that the best possible thermal operation be attained. Usually coke is used in the cupola as a fuel. Coke is largely carbon and therefore burns with a high heat release and is sufficiently strong to support the burden in a cupola. It is advantageous for the major combustion to occur directly above the hearth at the tuyere zone where the burden is melted and flows into the hearth. Hot gases are evolved which rise through the cupola preheating the burden and preparing it for melting. Actual melting is detrimental to the proper operation of a cupola if it occurs too high in the cupola shaft. Coke, however, tends to be porous due to the expelling of copious amounts of various gases during pyrolysis as the major step in its manufacture. While the coke may be made denser by closely confining the coal from which it is made during pyrolysis to prevent the coke from expanding while it is in a plastic state and hydrocarbons are escaping, a minimum porosity still remains. Furthermore, the denser metallurgical cokes made from select coking coals are more expensive than other cokes, although the denser structure results in better strength, ignition and burning properties. The properties of coke for use in a shaft furnace, whether a metallurgical furnace or other melting furnaces such as siliceous mineral melting furnaces, for example, mineral wool melting furnaces, are therefore not completely satisfactory, particularly with respect to density and ignition properties. The moisture content of conventional coke is also quite variable after storage prior to use. Consequently, there has been a need for a better yet more economical fuel for shaft furnaces such as mineral wool cupolas.

The electrolytic reduction vessels used in the aluminum industry are lined with carbon to protect the structural shell from the molten bath and serve as an electrical conductor (the cathode) during operation of the reduction vessels. There are two principal types of such carbon linings, or pot linings, namely prebaked block linings and rammed carbon linings. Cryolite, which contains high percentages of sodium, fluorine and aluminum, is used as the electrolyte in the electrolytic smelting process used in aluminum refining operations. After the carbon lining of the smelting pot has been used to such an extent that it is considered worn out, it contains on the average about 60% carbon, about 12% sodium, about 13% fluorine, 10% aluminum and 5% miscellaneous other material, largely residuals from the ash content of anthracite fines used as a major constituent in the carbon cathode lining. The cryolite in its liquid form invades the pores in the carbon lining and is responsible for the sodium, fluorine and aluminum found in the worn out or spent pot linings.

Spent pot lining, or SPL, is essentially a waste product which must be disposed of in some ecologically satisfactory manner. Although the high fluorine content can be leached from SPL fines in a separate operation, SPL does not lend itself readily to use as a fuel or the like because of such high fluorine content which may have other detrimental effects. For example, SPL has been tried in the past as a coke replacement in foundry cupolas and the like. Such tests have met with little success, largely because the fluorine has been found to seriously attack the lining of the cupola and also creates a cold slag condition unacceptable in foundry operations. There has been a definite need, therefore, for some method of disposal of large amounts of spent pot lining (SPL) preferably as a feed stock for a succeeding process.

OBJECTS OF THE INVENTION

It is an object of the invention therefore to provide a method of operating a mineral wool cupola in which a novel fuel charge material is used which provides superior cupola furnace performance.

It is a further object to provide a novel highly graphitized fuel which performs more efficiently than coke as a fuel.

It is a further object of the invention to provide a fuel charge material for mineral wool cupolas which inhibits siliceous build-up in such cupolas.

It is a still further object of the invention to provide a method of operating a mineral wool cupola in which the use of a novel fuel charge material provides both heat values and removes detrimental siliceous build-up.

It is a still further object of the invention to provide a fuel for cupolas which chemically removes siliceous build-up from said furnace.

It is a still further object of the invention to provide a fuel charge for a mineral wool furnace which provides an increased heat evolution and hotter slag adjacent the tuyere zone.

It is a still further object of the invention to provide a method of operating a mineral wool cupola with an increased siliceous content which can be used to produce higher silica content fibers.

It is a still further object of the invention to provide a new method of operating a mineral wool cupola using spent pot lining from aluminum operations.

It is a still further object of the invention to provide a smoother, cleaner operation for a mineral wool cupola and produce a more uniform melt with superior fiberization characteristics.

It is a still further object of the invention to provide a new and useful method of disposing of spent pot lining from aluminum operations.

It is a still further object of the invention to provide a combustible material which contains sufficient amounts of fluorides adapted for release low in the cupola hearth where they may react and dissolve siliceous build-up.

It is a still further object of the invention to provide a new method of operating a mineral wool cupola with increased yield due to superior molten slag consistency.

Other objects and advantages of the invention will become evident from consideration of the following description of the invention and appended claims.

BRIEF DESCRIPTION OF THE INVENTION

The present inventor has discovered that siliceous build-up in siliceous furnaces such as, in particular, mineral wool cupolas can be both inhibited and removed by adding to the furnace as one of the charge materials a fuel material containing significant amounts of fluorine. Such material can be formed by treating graphite or other carbon with a fluorine compound such as cryolite.

Alternatively spent pot lining from electrolytic reduction vessels in the aluminum industry can be used. The material is desirably sized from one-half ($\frac{1}{2}$) to six (6) inches (1.27 to 15.54 cm) in diameter and preferably in the size range or with the bulk of the material in the size range of from about two to four or somewhat less preferably two to five inches (5.08 to 10.16 or 12.7 cm) in diameter. When provided in such size range the fluorine is released by burning of the carbon close to the hearth of the furnace, i.e. adjacent to any siliceous build-up material, and has a chance to react upon such material and enter into the siliceous melt which can hold fluorine up to approximately two percent of the weight of the bath. The denseness of the carbon or graphite soaked in cryolite or cryolitic type material also prevents early release of the fluorine from the carbon so it has a chance to react with the siliceous material contrary to prior processes. The molten siliceous material is also held in a more fluid state due to the influence of the fluoride ions present and a greater heat evolution from the tuyere zone during operation due to more efficient ignition and burning of the denser graphitic carbon lumps. Alternatively, a siliceous build-up inhibiting or removing fuel briquette may be formed from the fines of spent pot lining along with coke plant pitch which acts as a binder together preferably with anthracite fines and coke fines. In all cases the spent pot lining may constitute up to about 70% of the fuel carbon, plus or minus 10% and preferably plus or minus 5% without significant modification of the operation of the usual cupola. Above about 75% to 80% spent pot lining there may be excessive attack upon the hearth of the cupola so that special precautions must be taken to protect the hearth such as by forced cooling from underneath when using 80% up to 100% of the special fluorine containing fuel of the invention.

DESCRIPTION OF THE PREFERRED EMBODIMENTS

Figure 1:
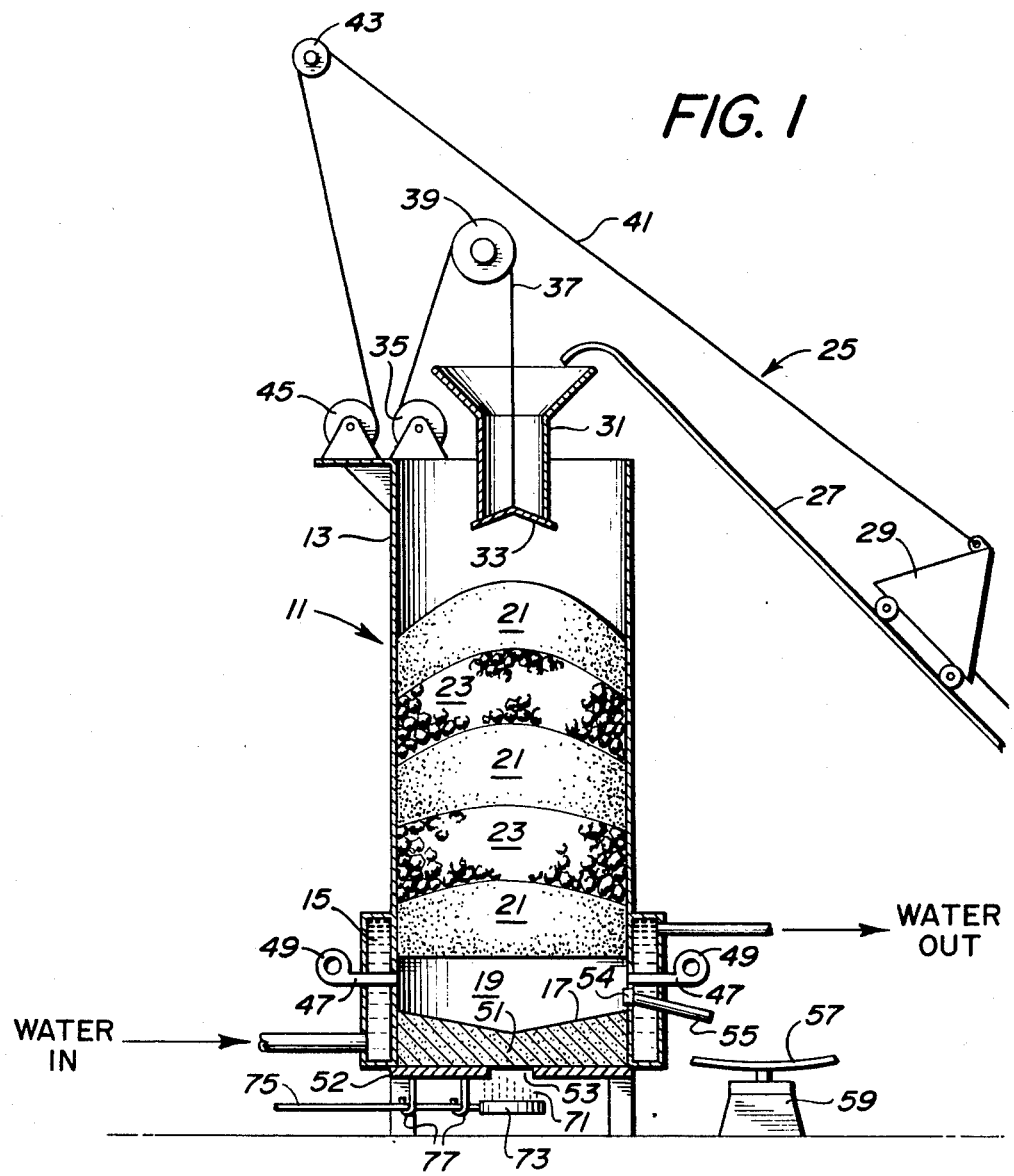
FIG. 1 shows a partially broken away schematic elevation of a mineral wool cupola showing the alternating layers of fuel material, including the spent pot lining fuel of the invention, and siliceous material in the form of slag and rock within the cupola.

As indicated in the introduction, mineral wool cupolas must be operated very efficiently in order to stay within economic limits. The heating or operating fuel in the form of coke is the most expensive of the materials charged into a cupola. Coke is used as a fuel because it has sufficient strength to support the burden in the cupola. Coke, however, has certain drawbacks as a fuel due to its porous nature which can lead to variable moisture content and variable fuel values. Coke tends also to react more or less with the hot gases leaving the tuyere zone and thereby to be partially consumed in an inefficient manner. A further troublesome problem with mineral wool cupolas is the frequent build-up of persistent solid deposits of siliceous materials known as "siliceous build-up". Siliceous build-up, which occurs mostly in the hearth, but also sometimes on the side walls of the cupola, particularly where such side walls are slanted as in the bosh type cupolas, seriously interferes with the operation of a cupola. Such interference is due to the reduction of the capacity of the cupola, by physically taking up space particularly in the hearth where excess build-up may leave little if any room for the molten material prior to tapping.

The reduction in hearth capacity is particularl serious with respect to molten metallics which normally collect in the center of the bottom of the hearth and are periodically tapped from the cupola hearth area, usually on a four to eight hour schedule, to eliminate such metallics. These metallics cannot become mixed together with the molten siliceous material from which mineral fiber is to be formed if such fiber is to be satisfactory. The formation of siliceous build-up upon the hearth also reduces the clearance between the hearth and the tuyere zone, or combustion zone, in the furnace and disrupts the operation of the furnace by changing the effective combustion level.

The present inventor has discovered that if spent pot lining, commonly referred to as SPL, is substituted for up to 100% of the normally used coke, not only is the fuel efficiency increased, i.e. the cupola becomes hotter for the same amount of charge, particularly in the tuyere area, and the molten product, i.e. the siliceous material which is melted to form fibers of mineral wool, appears more fluid or less viscous as well as more uniform, further improving the product and the operation, but that siliceous build-up is also decreased or inhibited and in fact with continued operation of a cupola in which build-up has already occurred, such build-up is over a period removed or cut back. A major problem is thereby solved to such an extent that virtually continuous operation of the cupola or furnace can be obtained.

The present inventor has also found that the elimination of the siliceous build-up problem is largely due to the structure and chemistry of the SPL in that the lining of electrolytic reduction vessels in the aluminum industry is essentially graphitic carbon which is relatively dense and that after having been exposed to the cryolite electrolyte in the aluminum reduction process the lining, i.e. after having absorbed fairly large amounts of the electrolyte, becomes more dense still. This causes the SPL to be resistant to ignition and combustion so that the major combustion occurs at the tuyere zone resulting in a greater heat release in this zone and a superior thermal operation of the cupola, essentially "keeping the fire low" in the cupola. It is undesirable to have the fire or combustion in the cupola extend to high elevations since this results in coke being combusted at lower temperature and in an inefficient manner. In addition, less dense more reactive coke or other fuel will react with hot ascending gases leaving the combustion zone resulting in the partial solution of the coke to produce gas which is richer than otherwise in carbon monoxide, but of little value in the typical mineral wool process. Such solution loss is therefore wasteful and to be avoided and is, in fact, avoided by the operation of the cupola with the novel SPL fuel of the invention.

The present inventor has unexpectedly found further that the low reactivity of the SPL has the further advantage that the fluorides in the cryolite electrolyte which has soaked into the graphitic SPL are released upon combustion of the carbon or graphite low in the cupola near the hearth and in the vicinity of the siliceous build-up. This is contrary to past experimental additions of flux type materials such as fluorides and the like to the burden in the furnace or cupola in an effort to decrease the siliceous build-up. Such materials tend then to be carried from the cupola in the melt rather than reacting with the siliceous build-up material.

FIG. 1 shows a partially broken away schematic elevation of a mineral wool cupola 11 comprised of a steel shell 13 which may be air cooled in the upper portions and water cooled by a water jacket 15 in the hearth area 17 and extending upwardly from the hearth and the tuyere area 19. Meltables 21, normally comprising rock and slag, such as trap rock and blast furnace and electric furnace slag from iron and steel making operations, and solid fuel materials 23 either SPL or coke mixed with SPL are fed into the furnace in alternating layers, as shown in the Figure. A skip hoist arrangement 25 comprising an inclined track 27 and a skip hoist car 29 conveys the burden materials, i.e. the fuel materials (coke and/or SPL) and meltables, to the top of the cupola and dumps them into the cupola, preferably through a periodically opening bell arrangement 31 as shown. The materials from the skip hoist will accumulate on the closure 33 of the tubular bell structure until the cupola operator opens the closure by operation of winch 35 which is connected to and movably supports the closure 33 via a cable 37 passing over a pulley arrangement 39. When the closure 33 opens, the burden material slides into the furnace after which the closure 33 may automatically return to the closed position until burden material again collects on its upper surface and the operator again opens the closure 33. Other bell or charging arrangements may, of course, be used.

The skip hoist car 29 is drawn up the track 27 by means of a cable 41 which passes over an idler sheave 43 and then to a winch arrangement 45 mounted on the top of the cupola.

Air is blown into the cupola in the combustion zone 19 through tuyeres 47 by centrifugal blast fans 49. A layer of loam and/or clay 51 is supported upon the bottom of the hearth area 17 of the cupola to insulate the bottom from the molten material within the hearth and particularly from melted metallics such as iron and various residual metallic components of the slag material charged to the cupola. This metallic material must be tapped from the center of the generally disk shaped hearth periodically through tap hole opening 53 provided in the supporting bttom 52 of the cupola. A temporary tap hole is periodically burned or otherwise opened through the loam layer 51 upon the hearth, which loam layer may be usually from six to eight inches deep, to release the metallics collected in the center of the disk shaped hearth and prevent them from becoming mixed with the siliceous melt material. The temporary tap hole through the refractory loan material is then plugged. The molten siliceous material is continuously tapped through a water cooled replaceable steel slag notch 54 and carried by a slag or melt trough 55 onto a rotating or spinning fiber forming disk 57 which is rotated by motor 59. As the molten siliceous material falls onto the spinning disk 57, the centrifugal force engendered by the rotation causes the material to migrate up or along the inside of the disk to the edge where droplets are flung off and attenuated into fibers which promptly solidify. An air blast or steam blast from a blast pipe, not shown, positioned along the edge of the disk may be used to accelerate the droplets which then form tails or fibers as they undergo drag effects as they penetrate the surrounding air. Alternatively the blast or blow may be used alone to shred the melted materials as they flow from the tap spout. In any event, the method of fiberization of melt materials forms no part of the present invention. The molten siliceous material will, however, as a result of the invention be desirably of a higher silica content and more uniform consistency and will consequently form superior fibers.

The fibers may be collected from around the fiberization device, in this case the spinning dish 57, in any suitable manner. If more than 80% synthetic or natural SPL fuel material in accordance with this invention is used as a part of the charge in the cupola, it may be desirable to use additional forced cooling of the hearth such as water sprays 71 from an annular spray head 73 to cool the bottom of the hearth and prevent dissolution of the hearth, i.e. to prevent the opposite of siliceous build-up. The amount of cooling may be varied somewhat depending upon the fluorine content of the fuel.

Figure 3:
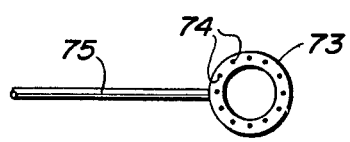
FIG. 3 shows a plan view of an annular spray head designed for cooling the bottom of the hearth when more than about 80% of the fuel of the invention is used in the cupola charge.

The annular spray head 73 which is shown in plan view in FIG. 3 is removably positioned about 6 to 12 inches below the center of the hearth about the tap hole area 53. Cooling water flows to the annular spray head 73 through supply pipe 75 from any suitable supply source, not shown, at a pressure sufficient to provide the water sprays 71 from orifices 72 of a height which will impinge upon the bottom of the hearth, cooling the hearth and making it less reactive so that the hearth materials will not fail over a period making the cupola in effect self-tapping so that the contents of the cupola are unexpectedly released. The supply pipe 75 may be conveniently hung from U-shaped hangers 77 on the bottom of the cupola structure or may be otherwise supported so the pipe and spray head may be removed when the metallics are to be tapped.

The spent pot lining material prior to being charged to the cupola is sized between one-half inch ($\frac{1}{2}$″) (1.27 cm) and six (6) inches (15.54 cm) by crushing and screening and will be preferably between two (2) and four (4) inches (5.08 to 10.16 cm) or somewhat less preferably five (5) inches (12.7 cm), i.e. the SPL after crushing will pass through a four inch (10.16 cm) or five inch (12.7 cm) screen and be retained on a two inch (5.08 cm) screen. As indicated, it is desirable to use 2 to 4 inch (5.08 to 10.16 cm) pieces of SPL material as the fuel charge as this generally provides the best fuel and burden support efficiency. However, from a practical standpoint, the attempt during preparation of the SPL for use to obtain the best range may result in such a large rejection of fines of 30% or even more, that it may prove more economical to use the technically less preferred range of 2 to 5 inches (5.08 to 12.7 cm) for the bulk of the material within the broad range of one half inch (1.27 cm) to six inches (15.54 cm) particulate size. Thus, while it might be desirable to use the best range of SPL material, the use of the less preferable range for either all of the material, or more practical still, for the bulk of the material, will be operationally satisfactory both as to burden support and gas permeability.

As indicated the graphitic material of the SPL is inherently denser and less reactive than normal coke and is also impregnated or coated with a cryolitic slag which further seals any pores in the carbon structure. The material is thus quite unreactive as compared to coke and, in fact, reacts only to a very small degree, if at all, in the upper portions of the cupola, but burns steadily and with a large evolution of heat in the tuyere area of the cupola. As explained, this is very advantageous as the SPL does not therefore significantly react with any rising gases as does coke with basically a wastage of heat values in a portion of the cupola where such heat values are neither desired nor effective and frequently where the reaction of the coke causes physical degradation of the coke leading to loss of permeability in the coke bed in the cupola with decreased combustion efficiency. The fully retained size of the SPL as it migrates down the cupola assists in the maintenance of good charge permability in the bottom or lower portions of the cupola where a satisfactory permability is required for the passage of the incoming combustion air and for outward flow of molten liquids. Thus the SPL fuel of the invention is relatively more likely to reach the hearth area of the furnace where it can be optimally combusted in essentially its original condition. As explained, this is not only because the graphitic material is inherently more dense than coke, but also because the initial porosity of the carbon as used in the lining of an electrolytic aluminum reduction vessel is invaded while in use in such vessel by the cryolite slag phase which essentially removes or eliminates such porosity. Hot gases in the cupola cannot therefore react in depth with the carbon, but react only on the surface of the spent pot lining material. The fluorine released from SPL is soluble in the melt up to about 2%. The fluorine ion is substantially the same size as the oxygen ion and is therefore readily replaceable in siliceous material for oxygen with no distortion of the space lattice and no decrease in physical properties of the siliceous material up to the solution limit of about 2%.

In calculating the cupola burden coke is usually arbitrarily assigned a carbon value of 90%, i.e. 90% of the coke will combust to form CO or $CO_2$, and spent pot lining material may also be somewhat arbitrarily assigned an average carbon value of 60%. The substitution of SPL for coke on a carbon-equivalent basis, therefore, results in the use of approximately 1.5 pounds of SPL to replace 1.0 pound of coke in the normal charge. An effective burden charge for a cupola has thus been found to be as shown in Table 1 below where case B is a preferred practice of the invention.

TABLE 1

| CUPOLA BURDEN PRACTICE - POUNDS PER CHARGE | | |
|---|---|---|
| Meltables (slags, rocks) | | 3000 |
| Fuels | | |
| Case A | Coke | 400 |
| Case B | 50% Coke | 200 |
| | 50% SPL | 300 |

Sizing the SPL too large results in a loss of fuel efficiency. Sizing the SPL too small results in excessive fines loss, as the minus ½ inch (1.27 cm) material and preferably also the minus 1-inch (2.54 cm) material is not used in the cupola. It has been found that a jaw crusher can produce SPL sized between 6 inches (15.54 cm) and 1 inch (2.54 cm) with only about 10% loss in fines. When this size SPL is substituted for coke, as in Table 1, the cupola tends to become hotter evidencing that the fuel efficiency of SPL can exceed the fuel efficiency of coke on a carbon-equivalent basis.

The slag phase contains sodium, aluminum and fluorine, all of which can benefit the melting process in the cupola. The sodium and aluminum cations enter the melt and are found in the glass phase resulting from the fiberization of the melt. Aluminum helps to make longer and stronger fibers while the sodium is a strong base which is a commonly used constituent in commercial glass manufacture. The fluorine helps bring silica into solution in the hearth.

Fluorine as explained above also keeps hearths from building up with silica residuals, a problem which often can cause the cupola operator to drop the cupola bottoms to remove the build-ups. Trials have shown the addition of SPL to cupolas which already have built-up hearths will flush out the build-up and allow longer operating campaigns. Fluorine, like sodium and aluminum, can become part of the melt and a stable component in the mineral fiber since as pointed out above it has the same ionic dimensions as oxygen and tends to replace oxygen on a one to one basis in the space lattice. Since SPL also usually contains only about 0.15% sulfur as compared to 0.7 to 1% for the usual coke used in mineral cupolas with somewhat detrimental results, the decreased sulfur burden is also advantageous.

The unexpected effectiveness of SPL in reducing siliceous build-up and preventing "high bottom" and other difficulties in cupolas is, as indicated above, a direct result of the fact that the fluorine is released from the SPL low in the cupola in the combustion zone near the build-up rather than the slag melting zone higher up in the cupola from where it would be tapped from the cupola with little possible contact with the siliceous build-up. Such delayed release is believed due to two major factors (a) the cryolite slag generally impregnates the SPL to the extent that there is no porous structure as in the case of coke so it is only upon combustion of the carbon in the SPL that it is released in the combustion zone, (b) the relative inactivity of the SPL carbon due both to its dense graphitic structure as well as to the fact that it is both coated, and thoroughly impregnated with cryolitic slag which in itself reduces the reactivity with combustion oxygen or other oxidizing gases passing up the cupola shaft. A lesser advantage is the substantial lack of any substantial moisture content in the SPL as it is produced and stored without the pickup of any substantial moisture due to its impregnation with the cryolitic material.

Figure 2:
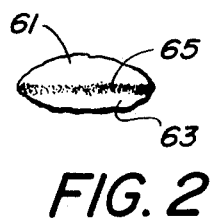
FIG. 2 shows a fuel briquette formed of spent pot lining fines and other material.

The present inventor has also discovered that while it is very desirable to use spent pot lining for his invention in those cases where it is particularly desirable to decrease silicon build-up in a mineral wool cupola and SPL, which is economical and usually readily available, is not available, that cryolite or a similar composition containing in particular fluorine can be deliberately mixed with a carbon containing material such as coal, graphite or the like, sized, and/or briquetted and then used in the cupola as a part of the burden, whereupon, when the fluorine is released low in the shaft the siliceous build-up problem is alleviated. Briquettes can also be formed of spent pot lining fines and coke fines and bound together with coke plant pitch to form briquettes which can be used as all or a part of the fuel burden of a mineral wool cupola or other shaft furnace and will have the desired effect of reducing any siliceous build-up within the furnace because the fluorides from such briquettes are released low in the furnace shaft. A briquette thusly made is shown in FIG. 2. This particular briquette has a top 61, a bottom 63 and fins 65 on the sides resulting from the molding process by which it was formed, but could be in almost any form. A desirable composition would be approximately 40% coke fines, 45% spent pot lining fines and 15% coke plant pitch.

It has been found that the use of the cryolitic material impregnated carbon fuel of the present invention not only removes silicious build-up and results in a more efficient cupola operation by burning low in the cupola or hearth, but that the use of the fuel of the invention also results in a smoother cupola operation and more homogeneous melt discharged from the cupola, both as to temperature and composition. The solution of residuals in the melt is better so that such residuals do not form inhomogeneities in the melt which can result in defects in the final mineral wool fibers. Smooth operation becomes evident, for example, in a smoother running slag notch which requires less attention from the slag notch tender, one of the most difficult jobs in cupola operation.

Spent pot lining, or SPL, is as indicated above, derived from the electrolytic alumina reduction vessels. The fundamental principal of the Hall-Heroult process for the electrolytic dissociation of alumina is the solution of the alumina in a bath of aluminum fluoride plus the fluorides of one or more metals more electropositive than aluminum, e.g. sodium, potassium or calcium. Both natural and artificial cryolite are used as a base for making up the baths and the actual bath composition may vary over a fairly wide range. Pure cryolite, $Na_3AlF_6$, melts at 995° C. and a eutectic mixture 81.5 to 18.5 cryolite-alumina melts at 935° C. The melting points may be reduced to as low as 700° C. by the addition of various salts. The specific gravity of the bath must be less than that of liquid aluminum if the aluminum is to be tapped off at the bottom of the electrolytic cell. A typical bath may contain 66.8% aluminum fluoride and 33.2% sodium fluoride. A bath containing 59% aluminum fluoride, 21% alumina and 20% calcium fluoride has been popular. As can be seen, therefore, the composition of the aluminium reduction bath or cryolitic bath may vary fairly widely.

The carbon cathode used in the aluminum process may be prebaked blocks or rammed and baked in place. It is important in both cases for the carbon material to have a very low ash content. Consequently the material of construction for such cathodes are usually petroleum coke, anthracite fines of low ash value and coke plant pitch which are pressed into shape and baked resulting in a very dense graphitic electrode which is effectively made more dense by prolonged soaking during use in the cryolitic bath material.

Furthermore, as will be recognized from the above discussion, while a cryolitic soaked coke material forms the basic fuel charge of the invention, and this is most commonly provided by use of SPL, a synthetic carbonaceous fuel charge may also be made for the practice of the process of the present invention, which synthetic carbonaceous fuel need not be the best material for use in an aluminum reduction furnace, but which is especially compounded for use in a mineral wool cupola. Consequently, while as noted earlier, the typical fuel charge material of the invention may contain about 60% carbon, about 12% sodium, about 13% fluorine, 10% aluminum and 5% miscellaneous materials, materials suitable for the practice of this invention may contain plus or minus 10% of these various materials, but preferably plus or minus 5%. In other words, the carbon content can vary within the range of 50% to 70% carbon, but preferably between 55% to 65% carbon, fluorine may be between about 8% to 18%, but preferably about 10% to 15%, aluminum between 5% to 15%, but preferably 7% to 13% and sodium may be between 7% and 18%, but preferably 9% to 15% with other lesser materials, mostly potassium or calcium, making up any remainder.

It will be recognized from the foregoing disclosure and discussion that the present invention encompasses and provides all of the following:

(a) a new and advantageous method of operating mineral wool cupolas,
(b) a new and efficient method of disposing of spent pot lining without any detrimental environmental effects,
(c) a method for decreasing siliceous build-up in mineral wool cupolas,
(d) a new and advantageous fuel for mineral wool cupolas which is both more efficient and more economical than present fuels,
(e) a new fuel product which aids in decreasing and eliminating siliceous build-up in cupolas.

In an example of the invention a mineral wool cupola can be charged over an extended period with consecutive charge burdens comprising:
200 lbs. per charge of coke
300 lbs. per charge of spent pot lining
800 lbs. of blast furnace slag
700 lbs. of electric furnace slag
700 lbs. of so-called phos slag, i.e. electrofurnace phosphorus reduction slag
800 lbs. of trap rock Over an extended period a very desirable mineral wool fiber is produced with a more uniform temperature of the melts and no siliceous build-up in the cupola.

Without SPL the normal charge for such cupola would be:
400 lbs. coke
800 lbs. blast furnace slag
700 lbs. electric furnace slag
700 lbs. phos slag
800 lbs. trap rock Over a period the melt from such charge can run cooler in spite of the fact the carbon to meltables ratio is actually higher than with SPL due to about 100 pounds of cryolite slag in the 300 pounds of SPL used in the prior example. Periodic removal of siliceous build-up is also necessary. The market value of coke is, furthermore, about twice the cost of an equivalent amount of SPL on an equivalent carbon basis. It was previously thought by the inventor that no more than 50% of the charge of a cupola furnace should be SPL or a simulation of SPL. This was disclosed in the prior U.S. application Ser. No. 019,639 of which this application is a continuation-in-part. However, it has now been found that up to about 80% of the carbonaceous fuel charge can be SPL or SPL type material in normal practice and that up to 100% of the charge can be SPL if special precautions are taken such as, for example, forced cooling of the hearth bottom as explained above.

In the foregoing description and the following claims, the following terms shall have the meaning indicated as follows:

"Cryolytic material" means material which may comprise natural cryolite or general simulations of cryolite including very high percentages of fluoride such as in particular aluminum fluoride, sodium fluorides, calcium fluoride and the like.

"Carrier substance" means a particulate substance adapted to hold a relatively large amount of a cryolytic material or the like on the surface and in porosities, intersticies and the like in such material.

"Bulk of the material" means about 80% or more of the material plus or minus about fifteen percent.

While the present invention has been described at some length and with some particularity with respect to several embodiments, it is not intended that it be limited to any such particulars, but is to be construed broadly with reference to the appended claims so as to provide the broadest possible interpretation of such claims in view of the prior art and thereby to effectively encompass the intended scope of the invention.

I claim:

1. A method of operating a mineral wool cupola comprising charging to such cupola up to approximately 80% of the amount of carbonaceous fuel charged to said cupola along with meltables, of a relatively dense solid carbonaceous particulate material having a relatively low ignitability and low solution loss compared to the usual fuel as the result of at least a partial coating on some of the particulates and an impregnation in pores within substantially all of said carbonaceous particulates of a cryolytic material.

2. A method of operating a mineral wool cupola in accordance with claim 1 wherein the relatively dense solid carbonaceous particulate material is spent pot lining from an electrolytic aluminum reduction pot.

3. A method in accordance with claim 2 wherein the amount of spent pot lining is up to 100% of the carbonaceous fuel charged to said cupola with special precautions to prevent dissolution of the hearth area when over 80% spent pot lining is used.

4. A method in accordance with claim 2 wherein the spent pot lining is sized in the form of substantially one-half inch (1.27 cm) to six inch (15.54 cm) particulates having a dense structure with substantially all pores filled with a cryolitic material.

5. A method in accordance with claim 2 wherein the spent pot lining is sized in the form of substantially 2 inch (5.08 cm) to 5 inch (12.7 cm) particulates.

6. A method in accordance with claim 4 wherein the bulk of the spent pot lining is sized in the form of 2 inch (5.08 cm) to 5 inch (12.7 cm) particulates.

7. A method of inhibiting the formation of siliceous build-up in a mineral wool cupola comprising charging to said cupola an effective amount of a porous carrier substance carrying a cryolitic slag composition containing fluorides adapted to be released from the pores of the carrier in the combustion zone of the furnace.

8. A method in accordance with claim 7 wherein the carrier substance includes portions of spent pot lining from electrolytic aluminum reduction vessels.

9. A method in accordance with claim 7 wherein the carrier substance is substantially all spent pot lining.

10. A method in accordance with claim 9 in which the spent pot lining is charged up to approximately eighty percent of the carbon in the fuels used in the cupola based upon the carbon values of both the coke and the spent pot lining.

11. A method in accordance with claim 10 wherein the spent pot lining is sized in the form of substantially one-half inch (1.27 cm) to six inch (15.54 cm) particulates.

12. A method in accordance with claim 10 wherein the spent pot lining is sized in the form of substantially 2 inch (5.08 cm) to 5 inch (12.7 cm) particulates.

13. A method in accordance with claim 10 wherein the spent pot lining is sized in the form of substantially 2 inch (5.08 cm) to 4 inch (10.16 cm) particulates.

14. A method in accordance with claim 11 wherein the bulk of the pot lining added is sized in the form of 2 inch (5.08 cm) to 4 inch (10.16 cm) particulates.

15. A method in accordance with claim 11 wherein the bulk of the pot lining is sized in the form of 2 inch (5.08 cm) to 5 inch (12.7 cm) particulates.

16. A solid fuel addition for a mineral wool cupola comprising carbonaceous components and a fluoride component in the form of a cryolitic slag, said fuel addition having a low ignitability and adapted for release of said fluorides low in the cupola upon combustion of said solid fuel in the combustion zone adjacent any siliceous buildup in the cupola, pores in the carbonaceous material being filled with said cryolitic material said fuel addition being comprised of a plurality of particulates within a size range of one half inch (1.27 cm) to six inch (15.54 cm).

17. A solid fuel addition for mineral wool; cupolas in accordance with claim 16 wherein the fuel charge includes particles of spent pot lining from electrolytic aluminum reduction vessels bound together in briquette form with a carbonaceous binder.

18. A solid fuel addition for mineral wool cupolas in accordance with claim 16 wherein the fuel includes coke breeze and the like.

19. A solid fuel addition for mineral wool cupolas in accordance with claim 15 wherein the fuel is comprised substantially of spent pot lining.

20. A solid fuel for mineral wool cupolas in accordance with claim 19 wherein the spent pot lining is sized in the form of substantially 2 inch (5.08 cm) to 5 inch (12.7 cm) particulates.

21. A solid fuel for mineral wool cupolas in accordance with claim 19 wherein the bulk of the spent pot lining is sized in the form of substantially 2 inch (5.08 cm) to 4 inch (10.16 cm) particulates.

22. A method of disposing of spent pot lining from electrolytic aluminum reduction vessels without detrimental environmental consequences said spent pot lining being comprised of a solid carbonaceous particulate material having relatively low ignitability and low solution loss as the result of at least a partial coating on some of the particulates and impregnation in the pores of substantially all of said carbonaceous particulates of a cryolitic material comprising using said spent pot lining as a solid fuel in mineral wool cupolas in an amount of up to 80% of the carbonaceous fuel charge.

23. A method in accordance with claim 22 in which up to 100% of the carbonaceous fuel charge is spent pot lining.

24. A method in accordance with claim 22 wherein the spent pot lining is broken up by mechanical means and sized in the form of one half inch (1.27 cm) to 6 inch (15.54 cm) particulates prior to being added to the mineral wool cupola.

25. A method in accordance with claim 22 wherein the spent pot lining is sized in the form of 2 inch (5.08 cm) to 5 inch (12.7 cm) particulates prior to being added to the mineral wool cupolas.

26. A method in accordance with claim 22 wherein the spent pot lining is sized in the form of 2 inch (5.08 cm) to 4 inch (10.16 cm) particulates prior to being added to mineral wool cupolas.

27. A method in accordance with claim 23 wherein the bulk of the spent pot lining is sized in the form of 2 inch (5.08 cm) to 4 inch (10.16 cm) particulates.

28. A method in accordance with claim 23 wherein the bulk of the spent pot lining is sized in the form of 2 inch (5.08 cm) to 5 inch (12.7 cm) particulates.

* * * * *